United States Patent
Nitta et al.

(10) Patent No.: US 12,147,089 B2
(45) Date of Patent: Nov. 19, 2024

(54) CAMERA OPTICAL LENS

(71) Applicant: AAC Optics (Changzhou) Co., Ltd., Changzhou (CN)

(72) Inventors: Koji Nitta, Osaka (JP); Liyuan Wang, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 477 days.

(21) Appl. No.: 17/537,485

(22) Filed: Nov. 30, 2021

(65) Prior Publication Data

US 2022/0171164 A1 Jun. 2, 2022

(30) Foreign Application Priority Data

Nov. 30, 2020 (CN) .......................... 202011366928.3

(51) Int. Cl.
*G02B 13/00* (2006.01)
*G02B 9/64* (2006.01)

(52) U.S. Cl.
CPC ........... *G02B 9/64* (2013.01); *G02B 13/0045* (2013.01)

(58) Field of Classification Search
CPC ...... G02B 13/0045; G02B 9/64; G02B 13/18; G02B 27/0025; G02B 13/0015; G02B 13/06
See application file for complete search history.

(56) References Cited

U.S. PATENT DOCUMENTS

| | | | | |
|---|---|---|---|---|
| 2014/0139719 A1* | 5/2014 | Fukaya | ............... | G02B 27/0025 348/340 |
| 2019/0369367 A1* | 12/2019 | Park | ................... | G02B 13/0045 |
| 2020/0073085 A1* | 3/2020 | Huang | ...................... | G02B 9/64 |
| 2021/0018729 A1* | 1/2021 | Li | ....................... | G02B 13/0045 |
| 2021/0048638 A1* | 2/2021 | Chen | ......................... | G02B 9/64 |
| 2021/0149160 A1* | 5/2021 | Dong | ........................ | G02B 9/64 |
| 2021/0149162 A1* | 5/2021 | Jhang | ................... | G02B 27/005 |
| 2022/0365317 A1* | 11/2022 | Chen | ........................ | G02B 9/64 |

* cited by examiner

*Primary Examiner* — Darryl J Collins
*Assistant Examiner* — Matthew Y Lee
(74) *Attorney, Agent, or Firm* — W&G Law Group (57) ABSTRACT

The present invention discloses a camera optical lens with seven-piece lens including, from an object side to an image side in sequence, a first lens having a positive refractive power, a second lens having a negative refractive power, a third lens having a positive refractive power, a fourth lens having a negative refractive power, a fifth lens having a negative refractive power, a sixth lens having a positive refractive power and a seventh lens having a negative refractive power. The camera optical lens satisfies the following conditions: $0.30 \leq R7/R5 \leq 1.50$ and $-3.00 \leq R13/R14 \leq -1.00$. The camera optical lens according to the present invention has excellent optical characteristics, such as large aperture, wide-angle, and ultra-thin.

19 Claims, 7 Drawing Sheets

CAMERA OPTICAL LENS

FIELD OF THE PRESENT INVENTION

The present invention relates to an optical lens, and more particularly, to a camera optical lens suitable for handheld terminal devices, such as smart phones and digital cameras, and imaging devices, such as monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance, Therefore, miniaturized imaging optical lenses with an excellent image quality have become the mainstream in the current market. In order to obtain better imaging quality, a multi-piece lens structure is often used. Moreover, with the development of technology and the increase of diversified needs of users, as the pixel area of the photosensitive device continues to shrink and the system's requirements for image quality continue to increase, the seven-element lens structure gradually appears in the lens design. There is an urgent need for a wide-angle camera optical lens with excellent optical characteristics, small size, and fully corrected aberrations.

SUMMARY

In the present invention, a cameral optical lens has excellent optical characteristics with large aperture stop, ultra-thin characteristic and wide-angle.

According to one aspect of the present invention, a camera optical lens with seven-piece lens includes, from an object side to an image side in sequence, a first lens having a positive refractive power, a second lens having a negative refractive power, a third lens having a positive refractive power, a fourth lens having a negative refractive power, a fifth lens having a negative refractive power, a sixth lens having a positive refractive power and a seventh lens having a negative refractive power. Herein the camera optical lens satisfies the following conditions: $0.30 \leq R7/R5 \leq 1.50$ and $-3.00 \leq R13/R14 \leq -1.00$. R5 denotes a central curvature radius of an object side surface of the third lens, R7 denotes a central curvature radius of an object side surface of the fourth lens, R13 denotes a central curvature radius of an object side surface of the seventh lens, and R14 denotes a central curvature radius of an image side surface of the seventh lens.

Further, the first lens has an object side surface being convex in a paraxial region and an image side surface being concave in the paraxial region. The camera optical lens further satisfies the following conditions: $0.48 \leq f1/f \leq 1.52$, $-3.30 (R1+R2)/(R1-R2) \leq -0.95$, and $0.07 \leq d1/TTL \leq 0.22$. f denotes a focal length of the optical camera lens, f1 denotes a focal length of the first lens, R1 denotes a central curvature radius of the object side surface of the first lens, R2 denotes a central curvature radius of the image side surface of the first lens, d1 denotes an on-axis thickness of the first lens, and TTL denotes a total optical length from the object side surface of the first lens of the camera optical lens to an image surface of the camera optical lens along an optical axis.

The camera optical lens further satisfies the following conditions: $0.77 \leq f1/f \leq 1.21$, $-2.06 (R1+R2)/(R1-R2) \leq -1.19$, and $0.11 \leq d1/TTL \leq 0.18$.

Further, the second lens has an object side surface being convex in a paraxial region and an image side surface being concave in the paraxial region. The camera optical lens further satisfies the following conditions: $-7.78 \leq f2/f \leq -1.89$, $1.81 \leq (R3+R4)/(R3-R4) \leq 6.38$, and $0.02 \leq d3/TTL \leq 0.06$. f denotes a focal length of the optical camera lens, f2 denotes a focal length of the second lens, R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens of the camera optical lens to an image surface of the camera optical lens along an optical axis.

The camera optical lens further satisfies the following conditions: $-4.86 \leq f2/f \leq -2.37$, $2.89 \leq (R3+R4)/(R3-R4) \leq 5.11$, and $0.03 \leq d3/TTL \leq 0.05$.

The camera optical lens further satisfies the following conditions: $3.65 \leq f3/f \leq 201.35$, $-23.31 \leq (R5+R6)/(R5-R6) \leq 29.49$, and $0.03 \leq d5/TTL \leq 0.11$. f denotes a focal length of the optical camera lens, f3 denotes a focal length of the third lens, R6 denotes a central curvature radius of an image side surface of the third lens, d5 denotes an on-axis thickness of the third lens, and TTL denotes a total optical length from an object side surface of the first lens of the camera optical lens to an image surface of the camera optical lens along an optical axis.

The camera optical lens further satisfies the following conditions: $5.84 \leq f3/f \leq 161.08$, $-14.57 \leq (R5+R6)/(R5-R6) \leq 23.59$, and $0.04 \leq d5/TTL \leq 0.09$.

Further, the fourth lens has an image side surface being concave in a paraxial region. The camera optical lens further satisfies the following conditions: $-17.16 \leq f4/f \leq -3.27$, $-1.91 \leq (R7+R8)/(R7-R8) \leq 8.52$, and $0.03 \leq d7/TTL \leq 0.09$. f denotes a focal length of the optical camera lens, f4 denotes a focal length of the fourth lens, R8 denotes a central curvature radius of the image side surface of the fourth lens, d7 denotes an on-axis thickness of the fourth lens, and TTL denotes a total optical length from an object side surface of the first lens of the camera optical lens to an image surface of the camera optical lens along an optical axis.

The camera optical lens further satisfies the following conditions: $-10.72 \leq f4/f \leq -4.09$, $-1.19 \leq (R7+R8)/(R7-R8) \leq 6.82$, and $0.04 \leq d7/TTL \leq 0.07$.

Further, the fifth lens has an object side surface being concave in a paraxial region and an image side surface being convex in the paraxial region. The camera optical lens further satisfies the following conditions: $-84.76 \leq f5/f \leq -1.20$, $-46.40 \leq (R9+R10)/(R9-R10) \leq 2.23$, and $0.04 \leq d9/TTL \leq 0.15$. f denotes a focal length of the optical camera lens, f5 denotes a focal length of the fifth lens, R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object side surface of the first lens of the camera optical lens to an image surface of the camera optical lens along an optical axis.

The camera optical lens further satisfies the following conditions: $-52.97 \leq f5/f \leq -1.50$, $-29.00 \leq (R9+R10)/(R9-R10) \leq 1.78$, and $0.06 \leq d9/TTL \leq 0.12$.

Further, the sixth lens has an object side surface being convex in a paraxial region and an image side surface being concave in the paraxial region. The camera optical lens further satisfies the following conditions: $0.29 \leq f6/f \leq 1.65$, $-4.56 \leq (R11+R12)/(R11-R12) \leq -0.34$, and $0.05 \leq d11/TTL \leq 0.16$. f denotes a focal length of the optical camera lens, f6 denotes a focal length of the sixth lens, R11 denotes a central curvature radius of the object side surface of the sixth lens, R12 denotes a central curvature radius of the image side surface of the sixth lens, d11 denotes an on-axis thickness of the sixth lens, and TTL denotes a total optical length from an object side surface of the first lens of the camera optical lens to an image surface of the camera optical lens along an optical axis.

The camera optical lens further satisfies the following conditions: $0.46 \leq f6/f \leq 1.32$, $-2.85 \leq (R11+R12)/(R11-R12) \leq -0.42$, and $0.07 \leq d11/TTL \leq 0.12$.

Further, the object side surface of the seventh lens is concave in a paraxial region and the image side surface of the seventh lens is concave in the paraxial region. The camera optical lens further satisfies the following conditions: $-1.93 \leq f7/f \leq -0.40$, $0.00 \leq (R13+R14)/(R13-R14) \leq 0.75$, and $0.04 \leq d13/TTL \leq 0.14$. f denotes a focal length of the optical camera lens, f7 denotes a focal length of the seventh lens, d13 denotes an on-axis thickness of the seventh lens, and TTL denotes a total optical length from an object side surface of the first lens of the camera optical lens to an image surface of the camera optical lens along an optical axis.

The camera optical lens further satisfies the following conditions: $-1.21 \leq f7/f \leq -0.51$, $0.00 \leq (R13+R14)/(R13-R14) \leq 0.60$, and $0.06 \leq d13/TTL \leq 0.11$.

Further, an FNO of the camera optical lens is less than or equal to 1.75. FNO denotes an F number of the camera optical lens.

Further, an FOV of the camera optical lens is greater than or equal to 77.66°. FOV denotes a field of view of the camera optical lens.

The camera optical lens further satisfies the following conditions: $TTL/IH \leq 1.56$. IH denotes an image height of the camera optical lens, and TTL denotes a total optical length from an object side surface of the first lens of the camera optical lens to an image surface of the camera optical lens along an optical axis.

The camera optical lens further satisfies the following conditions: $0.59 \leq f12/f \leq 2.07$. f denotes a focal length of the optical camera lens, and f12 denotes a combined focal length of the first lens and the second lens.

The camera optical lens further satisfies the following conditions: $0.95 \leq f12/f \leq 1.66$.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
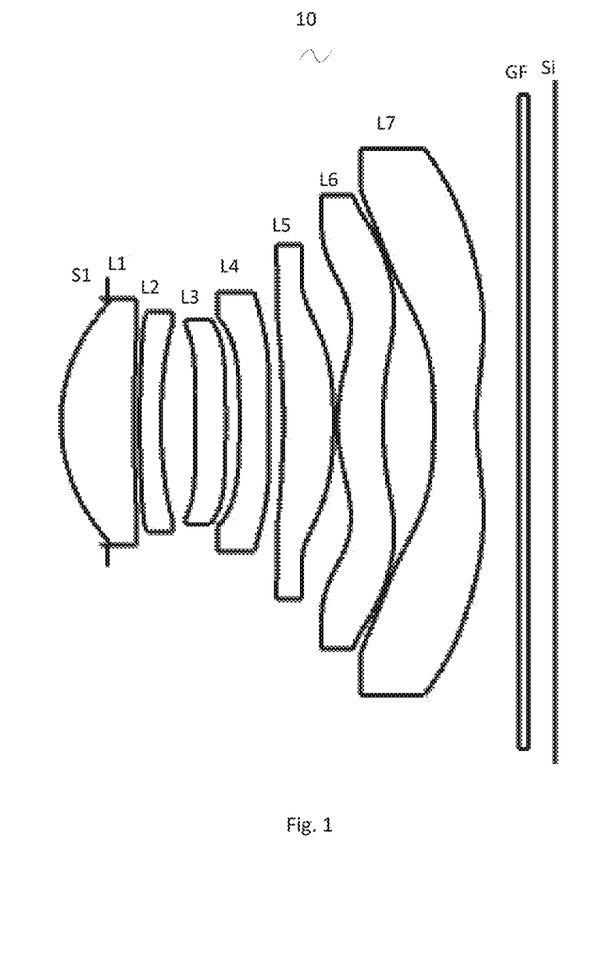
FIG. 1 is a schematic diagram of a structure of a camera optical lens in accordance with Embodiment 1 of the present invention.

As referring to the accompanying drawings, the present invention provides a camera optical lens 10. FIG. 1 is the camera optical lens 10 according to embodiment 1 of the present invention. The camera optical lens 10 comprises seven-piece lenses. Specifically, from an object side to an image side, the camera optical lens 10 comprises in sequence: an aperture S1, a first lens L1, a second lens L2, a third lens L3, a fourth lens L4, a fifth lens L5, a sixth lens L6 and a seventh lens L7. Optical elements like optical filter GF can be arranged between the seventh lens L7 and an image surface Si.

The first lens L1 is made of plastic material, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. In other optional embodiments, each lens may also be made of other materials.

In the present embodiment, a central curvature radius of an object side surface of the third lens L3 is defined as R5, and a central curvature radius of an object side surface of the fourth lens L4 is defined as R7. The camera optical lens 10 further satisfies the following condition: $0.30 \leq R7/R5 \leq 1.50$. By appropriately configuring the central curvature radius R5 of the object side surface of the third lens L3 and the central curvature radius R7 of the object side surface of the fourth lens L4, an aberration of the optical system is corrected, thereby improving an imaging quality.

In the present embodiment, a central curvature radius of an object side surface of the seventh lens L7 is defined as R13, and a central curvature radius of an image side surface of the seventh lens L7 is defined as R14. The camera optical lens 10 further satisfies the following condition: $-3.00 \leq R13/R14 \leq -1.00$, which specifies a shape of the seventh lens L7.

Within this range, as the development of ultra-thin and wide-angle lens, it benefits for solving the problems, such as correcting an off-axis aberration.

In the present embodiment, an object side surface of the first lens L1 is convex in a paraxial region, an image side surface of the first lens L1 is concave in the paraxial region, and the first lens L1 has a positive refractive power. In other optional embodiments, the object side surface and the image side surface of the first lens L1 can also be set to other concave and convex distribution situations.

A focal length of the camera optical lens 10 is defined as f, and a focal length of the first lens L1 is defined as f1. The camera optical lens 10 further satisfies the following condition: $0.48 \leq f1/f \leq 1.52$, which specifies a ratio of the positive refractive power of the first lens L1 to the focal length of the camera optical lens 10. Within this range, the first lens L1 has an appropriate positive refractive power, which is beneficial for reducing the aberration of the camera optical lens 10 and at the same time is beneficial for the development of ultra-thin and wide-angle lenses. Further, the following condition shall be satisfied, $0.77 \leq f1/f \leq 1.21$.

A central curvature radius of an object side surface of the first lens L1 is defined as R1, and a central curvature radius of an image side surface of the first lens L1 is defined as R2. The camera optical lens 10 further satisfies the following condition: $-3.30 \leq (R1+R2)/(R1-R2) \leq -0.95$. This condition reasonably controls a shape of the first lens L1, so that the first lens L1 can effectively correct a spherical aberration of the camera optical lens 10. Further, the following condition shall be satisfied, $-2.06 \leq (R1+R2)/(R1-R2) \leq -1.19$.

An on-axis thickness of the first lens L1 is defined as d1. A total optical length from the object side surface of the first lens L1 to the image surface Si of the camera optical lens 10 along an optical axis is defined as TTL. The camera optical lens 10 further satisfies the following condition: $0.07 \leq d1/TTL \leq 0.22$. Within this range, it benefits for realizing an ultra-thin effect. Further, the following condition shall be satisfied, $0.11 \leq d1/TTL \leq 0.18$.

In the present embodiment, an object side surface of the second lens L2 is convex in the paraxial region, an image side surface of the second lens L2 is concave in the paraxial region, and the second lens L2 has a negative refractive power. In other optional embodiments, the object side surface and the image side surface of the second lens L2 can also be set to other concave and convex distribution situations.

The focal length of the camera optical lens 10 is defined as f, and a focal length of the second lens L2 is defined as f2. The camera optical lens 10 further satisfies the following condition: $-7.78 \leq f2/f \leq -1.89$. It benefits for correcting the aberration of the camera optical lens 10 by controlling the positive refractive power of the second lens L2 being within reasonable range. Further, the following condition shall be satisfied, $-4.86 \leq f2/f \leq -2.37$.

The central curvature radius of the object side surface of the second lens L2 is defined as R3, and a central curvature radius of the image side surface of the second lens L2 is defined as R4. The camera optical lens 10 further satisfies the following condition: $1.81 \leq (R3+R4)/(R3-R4) \leq 6.38$, which specifies a shape of the second lens L2. Within this range, as the camera optical lens 10 develops toward ultra-thin and wide-angle, it is beneficial for correcting the problem of an on-axis chromatic aberration. Further, the following condition shall be satisfied, $2.89 \leq (R3+R4)/(R3-R4) \leq 5.11$.

An on-axis thickness of the second lens L2 is defined as d3. The total optical length from the object side surface of the first lens L1 to the image surface Si of the camera optical lens 10 along the optical axis is defined as TTL. The camera optical lens 10 further satisfies the following condition: $0.02 \leq d3/TTL \leq 0.06$. Within this range, it benefits for realizing an ultra-thin effect. Further, the following condition shall be satisfied, $0.03 \leq d3/TTL \leq 0.05$.

In the present embodiment, the object side surface of the third lens L3 is concave in the paraxial region, an image side surface of the third lens L3 is convex in the paraxial region, and the third lens L1 has a positive refractive power. In other optional embodiments, the object side surface and the image side surface of the third lens L3 can also be set to other concave and convex distribution situations.

The focal length of the camera optical lens 10 is defined as f, and a focal length of the third lens L3 is defined as f3. The camera optical lens 10 further satisfies the following condition: $3.65 \leq f3/f \leq 201.35$. By a reasonable distribution of the refractive power, which makes it possible that the camera optical lens 10 has the excellent imaging quality and a lower sensitivity. Further, the following condition shall be satisfied, $5.84 \leq f3/f \leq 161.08$.

The central curvature radius of the object side surface of the third lens L3 is defined as R5, and a central curvature radius of the image side surface of the third lens L3 is defined as R6. The camera optical lens 10 further satisfies the following condition: $-23.31 \leq (R5+R6)/(R5-R6) \leq 29.49$, which specifies a shape of the third lens 13. It is beneficial for a molding of the third lens L3. Within this range, a degree of deflection of light passing through the lens can be alleviated, and aberrations can be reduced effectively. Further, the following condition shall be satisfied, $-14.57 \leq (R5+R6)/(R5-R6) \leq 23.59$.

An on-axis thickness of the third lens L3 is defined as d5. The total optical length from the object side surface of the first lens L1 to the image surface Si of the camera optical lens 10 along the optical axis is defined as TTL. The camera optical lens 10 further satisfies the following condition: $0.03 \leq d5/TTL \leq 0.11$, which benefits for realizing the ultra-thin effect. Further, the following condition shall be satisfied, $0.04 \leq d5/TTL \leq 0.09$.

In the present embodiment, the object side surface of the fourth lens L4 is concave in the paraxial region, an image side surface of the fourth lens L4 is concave in the paraxial region, and the fourth lens L4 has a negative refractive power. In other optional embodiments, the object side surface and the image side surface of the fourth lens L4 can also be set to other concave and convex distribution situations.

The focal length of the camera optical lens 10 is defined as f, and a focal length of the fourth lens L4 is defined as f4. The camera optical lens 10 further satisfies the following condition: $-17.16 \leq f4/f \leq -3.27$. The appropriate distribution of the refractive power makes it possible that the camera optical lens 10 has the excellent imaging quality and the lower sensitivity. Further, the following condition shall be satisfied, $-10.72 \leq f4/f \leq -4.09$.

The curvature radius of the object side surface of the fourth lens L4 is defined as R7, and a central curvature radius of the image side surface of the fourth lens L4 is defined as R8. The camera optical lens further satisfies the following condition: $-1.91 \leq (R7+R8)/(R7-R8) \leq 8.52$, which specifies a shape of the fourth lens L4. Within this range, as the development of ultra-thin and wide-angle lens, it benefits for solving the problems, such as correcting the off-axis aberration. Further, the following condition shall be satisfied, $-1.19 \leq (R7+R8)/(R7-R8) \leq 6.82$.

An on-axis thickness of the fourth lens L4 is defined as d7. The total optical length from the object side surface of the first lens L1 to the image surface Si of the camera optical lens 10 along the optical axis is defined as TTL. The camera optical lens 10 further satisfies the following condition: 0.03≤d7/TTL≤0.09, which benefits for realizing the ultra-thin effect. Further, the following condition shall be satisfied, 0.04≤d7/TTL≤0.07.

In the present embodiment, an object side surface of the fifth lens L5 is concave in the paraxial region, an image side surface of the fifth lens L5 is convex in the paraxial region, and the fifth lens L5 has a negative refractive power. In other optional embodiments, the object side surface and the image side surface of the fifth lens L5 can also be set to other concave and convex distribution situations.

The focal length of the camera optical lens 10 is defined as f, and a focal length of the fifth lens L5 is defined as f5. The camera optical lens 10 further satisfies the following condition: −84.76≤f5/f≤−1.20. Within this range, a light angle of the camera optical lens 10 can be smoothed effectively and the sensitivity of the tolerance can be reduced. Further, the following condition shall be satisfied, −52.97≤f5/f≤−1.50.

A central curvature radius of the object side surface of the fifth lens L5 is defined as R9, and a central curvature radius of the image side surface of the fifth lens L5 is defined as R10. The camera optical lens further satisfies the following condition: −46.40≤(R9+R10)/(R9−R10)≤2.23, which specifies a shape of the fifth lens L5. Within this range, as the development of ultra-thin and wide-angle lens, it benefits for solving the problems, such as correcting the off-axis aberration. Further, the following condition shall be satisfied, −29.00≤(R9+R10)/(R9−R10)≤1.78.

An on-axis thickness of the fifth lens L5 is defined as d9. The total optical length from the object side surface of the first lens L1 to the image surface Si of the camera optical lens 10 along the optical axis is defined as TTL. The camera optical lens 10 further satisfies the following condition: 0.04≤d9/TTL≤0.15. Within this range, it benefits for realizing the ultra-thin effect. Further, the following condition shall be satisfied, 0.06≤d9/TTL≤0.12.

In the present embodiment, an object side surface of the sixth lens L6 is convex in the paraxial region, an image side surface of the sixth lens L6 is concave in the paraxial region, and the sixth lens L6 has a positive refractive power. In other optional embodiments, the object side surface and the image side surface of the sixth lens L6 can also be set to other concave and convex distribution situations.

The focal length of the camera optical lens 10 is defined as f, and a focal length of the sixth lens L6 is defined as f6. The camera optical lens further satisfies the following condition: 0.29≤f6/f≤1.65. The appropriate distribution of the refractive power makes it possible that the camera optical lens 10 has the excellent imaging quality and the lower sensitivity. Further, the following condition shall be satisfied, 0.46≤f6/f≤1.32.

A central curvature radius of the object side surface of the sixth lens L6 is defined as R11, and a central curvature radius of the image side surface of the sixth lens L6 is defined as R12. The camera optical lens further satisfies the following condition: −4.56≤(R11+R12)/(R11−R12)≤−0.34, which specifies a shape of the sixth lens L6. Within this range, as the development of ultra-thin and wide-angle lens, it benefits for solving the problems, such as correcting the off-axis aberration. Further, the following condition shall be satisfied, −2.85≤(R11+R12)/(R11−R12)≤−0.42.

An on-axis thickness of the sixth lens L6 is defined as d11. The total optical length from the object side surface of the first lens L1 to the image surface Si of the camera optical lens 10 along the optical axis is defined as TTL. The camera optical lens further satisfies the following condition: 0.05≤d11/TTL≤0.16, which benefits for realizing the ultra-thin effect. Further, the following condition shall be satisfied, 0.07≤d11/TTL≤0.12.

In the present embodiment, the object side surface of the seventh lens L7 is concave in the paraxial region, the image side surface of the seventh lens L7 is concave in the paraxial region, and the seventh lens L7 has a negative refractive power. In other optional embodiments, the object side surface and the image side surface of the seventh lens L7 can also be set to other concave and convex distribution situations.

The focal length of the camera optical lens 10 is defined as f, and a focal length of the seventh lens L7 is defined as f7. The camera optical lens 10 further satisfies the following condition: −1.93≤f7/f≤−0.40. The appropriate distribution of the refractive power makes it possible that the camera optical lens has the excellent imaging quality and the lower sensitivity. Further, the following condition shall be satisfied, −1.21≤f7/f≤−0.51.

The central curvature radius of the object side surface of the seventh lens L7 is defined as R13, and the central curvature radius of the image side surface of the seventh lens L7 is defined as R14. The camera optical lens 10 further satisfies the following condition: 0.00≤(R13+R14)/(R13−R14)≤0.75, which specifies a shape of the seventh lens L7. Within this range, as the development of ultra-thin and wide-angle lens, it benefits for solving the problems, such as correcting the off-axis aberration. Further, the following condition shall be satisfied, 0.00≤(R13+R14)/(R13−R14)≤0.60.

An on-axis thickness of the seventh lens L7 is defined as d13. The total optical length from the object side surface of the first lens L1 to the image surface Si of the camera optical lens 10 along the optical axis is defined as TTL. The camera optical lens further satisfies the following condition: 0.04≤d13/TTL≤0.14, which benefits for realizing the ultra-thin effect. Further, the following condition shall be satisfied, 0.06≤d13/TTL≤0.11.

In the present embodiment, the focal length of the camera optical lens 10 is f, and a combined focal length of the first lens L1 and the second lens L2 is defined as f12. The camera optical lens 10 further satisfies the following condition: 0.59≤f12/f≤2.07. This condition can eliminate the aberration and distortion of the camera optical lens 10, reduce a back focal length of the camera optical lens 10, and maintain the miniaturization of the camera lens system group. Further, the following condition shall be satisfied, 0.95≤f12/f≤1.66.

In the present embodiment, an image height of the camera optical lens 10 is defined as IH. The total optical length from the object side surface of the first lens L1 to the image surface Si of the camera optical lens 10 along an optical axis is defined as TTL. The camera optical lens 10 further satisfies the following condition: TTL/IH≤1.56, thereby achieving the ultra-thin performance. Further, the following condition shall be satisfied, TTL/IH≤1.52.

In the present embodiment, a field of view of the camera optical lens 10 in a diagonal direction is defined as FOV. The FOV is greater than or equal to 77.66°, thereby achieving the wide-angle performance. Further, the FOV is greater than or equal to 78.45°.

In the present embodiment, an F number (FNO) refers to a ratio of an effective focal length of the camera optical lens 10 to an entrance pupil diameter (ENPD). The F number (FNO) of the camera optical lens 10 is smaller than or equal to 1.75, thereby achieving a large aperture and the excellent imaging performance. Further, the FNO of the camera optical lens 10 is smaller than or equal to 1.72.

When satisfying above conditions, which makes it possible that the camera optical lens has excellent optical performances, and meanwhile can meet design requirements of ultra-thin, wide-angle lenses having the large aperture. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface Si of the camera optical lens 10 along the optical axis, the unit of TTL is mm. Further, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|     | R       | d    |        | nd     |    | vd    |
|-----|---------|------|--------|--------|----|-------|
| S1  | ∞       | d0=  | −0.543 |        |    |       |
| R1  | 2.002   | d1=  | 0.859  | 1.5444 | v1 | 55.82 |
| R2  | 8.794   | d2=  | 0.070  |        |    |       |
| R3  | 7.618   | d3=  | 0.250  | 1.6700 | v2 | 19.39 |
| R4  | 4.621   | d4=  | 0.410  |        |    |       |
| R5  | −88.184 | d5=  | 0.357  | 1.6153 | v3 | 25.94 |
| R6  | −51.598 | d6=  | 0.166  |        |    |       |
| R7  | −26.896 | d7=  | 0.350  | 1.6700 | v4 | 19.39 |
| R8  | 1190.610| d8=  | 0.170  |        |    |       |
| R9  | −5.396  | d9=  | 0.594  | 1.5444 | v5 | 55.82 |
| R10 | −5.897  | d10= | 0.045  |        |    |       |
| R11 | 1.977   | d11= | 0.540  | 1.5444 | v6 | 55.82 |
| R12 | 5.903   | d12= | 0.605  |        |    |       |

TABLE 1-continued

|     | R      | d    |       | nd  |        | vd    |
|-----|--------|------|-------|-----|--------|-------|
| R13 | −8.515 | d13= | 0.500 | nd7 | 1.5346 v7 | 55.69 |
| R14 | 2.843  | d14= | 0.504 |     |        |       |
| R15 | ∞      | d15= | 0.110 | ndg | 1.5168 vg | 64.20 |
| R16 | ∞      | d16= | 0.322 |     |        |       | where, the meaning of the various symbols is as follows.
S1: aperture;
R: curvature radius of an optical surface, a central curvature radius for a lens;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L5 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF;

Table 2 shows the aspherical surface data of the camera optical lens 10 in Embodiment 1 of the present invention.

TABLE 2

|    | Conic coefficient | Aspheric surface coefficients | | | | |
|----|---|---|---|---|---|---|
|    | k | A4 | A6 | A8 | A10 | A12 |
| R1 | 0.0000E+00 | 3.0679E−02 | −1.4867E−01 | 4.1082E−01 | −6.8716E−01 | 7.2494E−01 |
| R2 | 0.0000E+00 | −7.8149E−02 | 9.3305E−02 | −6.7114E−02 | 2.3047E−02 | 5.0103E−03 |
| R3 | 0.0000E+00 | −1.0473E−01 | 1.4064E−01 | −1.0942E−01 | 7.2859E−02 | −5.8828E−02 |
| R4 | 0.0000E+00 | −1.4524E−02 | −2.1366E−01 | 1.3074E+00 | −3.8289E+00 | 6.7894E+00 |

TABLE 2-continued

| | | | | | | |
|---|---|---|---|---|---|---|
| R5 | 0.0000E+00 | −1.8593E−02 | −1.9381E−01 | 8.0607E−01 | −2.1160E+00 | 3.4060E+00 |
| R6 | 0.0000E+00 | −3.7543E−02 | −1.1712E−01 | 5.5195E−01 | −1.4666E+00 | 2.2985E+00 |
| R7 | −1.0000E+00 | −1.5175E−01 | 4.0654E−01 | −1.5245E+00 | 3.4755E+00 | −4.9325E+00 |
| R8 | −1.0000E+00 | −1.8012E−02 | −5.5314E−02 | −3.2148E−02 | 1.6103E−01 | −1.7968E−01 |
| R9 | 0.0000E+00 | 1.3241E−01 | −1.3503E−01 | 1.1989E−02 | 7.9548E−02 | −6.8611E−02 |
| R10 | −2.7720E+00 | −6.9101E−02 | −9.2142E−02 | 2.2540E−01 | −2.3170E−01 | 1.3860E−01 |
| R11 | −1.6222E+00 | −6.1420E−02 | −7.3896E−02 | 7.8177E−02 | −4.8193E−02 | 1.8746E−02 |
| R12 | 0.0000E+00 | 1.3334E−01 | −1.9797E−01 | 1.2716E−01 | −5.3355E−02 | 1.5079E−02 |
| R13 | 0.0000E+00 | −9.7509E−02 | 2.7042E−02 | −1.2109E−03 | 8.4387E−05 | −2.0014E−04 |
| R14 | −5.4790E+00 | −1.0806E−01 | 4.8176E−02 | −1.8004E−02 | 5.2067E−03 | −1.0243E−03 |

| | Conic coefficient | Aspheric surface coefficients | | | |
|---|---|---|---|---|---|
| | k | A14 | A16 | A18 | A20 |
| R1 | 0.0000E+00 | −4.8601E−01 | 2.0084E−01 | −4.6704E−02 | 4.6678E−03 |
| R2 | 0.0000E+00 | −1.3639E−02 | 9.3677E−03 | −3.1709E−03 | 4.5720E−04 |
| R3 | 0.0000E+00 | 4.2948E−02 | −1.7982E−02 | 3.1356E−03 | 8.1860E−05 |
| R4 | 0.0000E+00 | −7.5522E+00 | 5.1436E+00 | −1.9607E+00 | 3.2118E−01 |
| R5 | 0.0000E+00 | −3.4640E+00 | 2.1551E+00 | −7.4630E−01 | 1.1073E−01 |
| R6 | 0.0000E+00 | −2.2514E+00 | 1.3276E+00 | −4.2475E−01 | 5.5969E−02 |
| R7 | −1.0000E+00 | 4.4198E+00 | −2.4682E+00 | 7.9379E−01 | −1.1318E−01 |
| R8 | −1.0000E+00 | 1.0477E−01 | −3.4178E−02 | 5.7673E−03 | −3.7887E−04 |
| R9 | 0.0000E+00 | 2.8346E−02 | −6.6413E−03 | 8.4480E−04 | −4.5086E−05 |
| R10 | −2.7720E+00 | −4.9014E−02 | 1.0066E−02 | −1.1122E−03 | 5.1272E−05 |
| R11 | −1.6222E+00 | −4.3918E−03 | 6.0119E−04 | −4.4445E−05 | 1.3744E−06 |
| R12 | 0.0000E+00 | −2.7821E−03 | 3.1701E−04 | −2.0107E−05 | 5.4109E−07 |
| R13 | 0.0000E+00 | 4.4067E−05 | −2.9675E−06 | −2.4039E−08 | 6.7353E−09 |
| R14 | −5.4790E+00 | 1.2865E−04 | −9.8388E−06 | 4.1787E−07 | −7.5709E−09 |

For convenience, an aspheric surface of each lens surface uses the aspheric surfaces shown in the below condition (1). However, the present invention is not limited to the aspherical polynomials form shown in the condition (1).

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Where, K is a conic coefficient, A4, A6, A8, A10, A12, A14, A16, A18, A20 are aspheric surface coefficients. c is the curvature at the center of the optical surface. r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, P6R1 and P6R2 represent the object side surface and the image side surface of the sixth lens L6, and P7R1 and P7R2 represent the object side surface and the image side surface of the seventh lens L7. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.335 | / | / | / |
| P1R2 | 4 | 0.565 | 0.655 | 0.795 | 1.295 |
| P2R1 | 0 | / | / | / | / |
| P2R2 | 0 | / | / | / | / |
| P3R1 | 0 | / | / | / | / |
| P3R2 | 0 | / | / | / | / |
| P4R1 | 0 | / | / | / | / |
| P4R2 | 2 | 0.065 | 1.485 | / | / |
| P5R1 | 3 | 1.065 | 1.565 | 1.825 | / |
| P5R2 | 3 | 1.225 | 1.825 | 2.035 | / |
| P6R1 | 2 | 0.635 | 1.705 | / | / |
| P6R2 | 2 | 0.815 | 2.375 | / | / |
| P7R1 | 3 | 1.455 | 2.065 | 2.415 | / |
| P7R2 | 1 | 0.545 | / | / | / |

TABLE 4

| | Number of arrest points | Arrest point position 1 | Arrest point position 2 | Arrest point position 3 |
|---|---|---|---|---|
| P1R1 | 0 | / | / | / |
| P1R2 | 1 | 1.175 | / | / |
| P2R1 | 0 | / | / | / |
| P2R2 | 0 | / | / | / |
| P3R1 | 0 | / | / | / |
| P3R2 | 0 | / | / | / |
| P4R1 | 0 | / | / | / |
| P4R2 | 1 | 0.105 | / | / |
| P5R1 | 2 | 1.405 | 1.685 | / |
| P5R2 | 3 | 1.715 | 1.975 | 2.065 |
| P6R1 | 2 | 1.115 | 2.355 | / |
| P6R2 | 1 | 1.305 | / | / |
| P7R1 | 0 | / | / | / |
| P7R2 | 1 | 1.105 | / | / |

Figure 2:
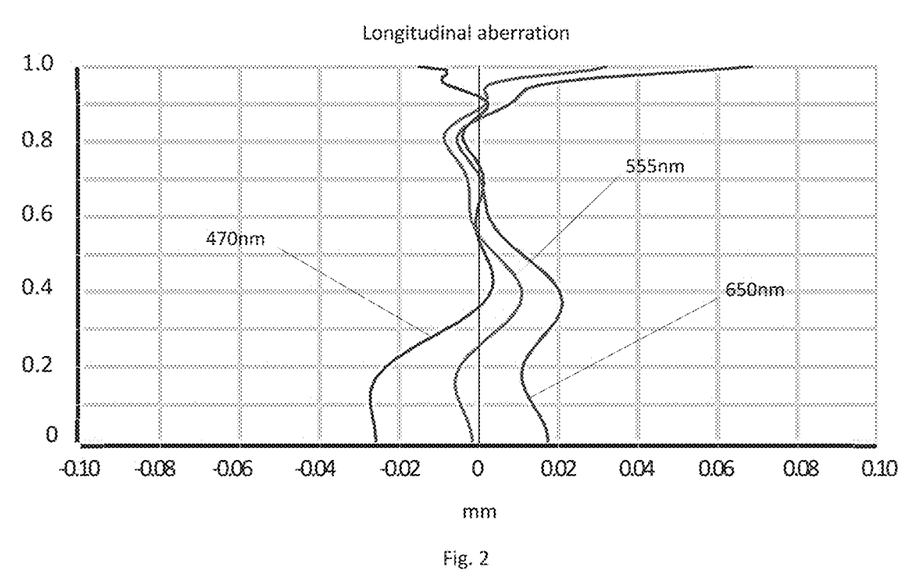
FIG. 2 is a schematic diagram of a longitudinal aberration of the camera optical lens shown in FIG. 1.
Figure 3:
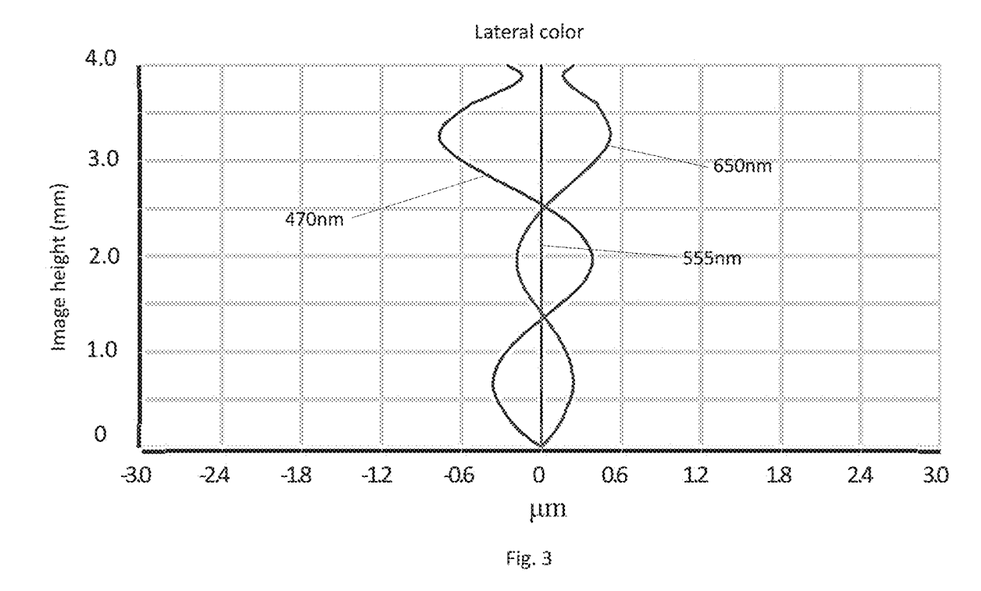
FIG. 3 is a schematic diagram of a lateral color of the camera optical lens shown in FIG. 1.
Figure 4:
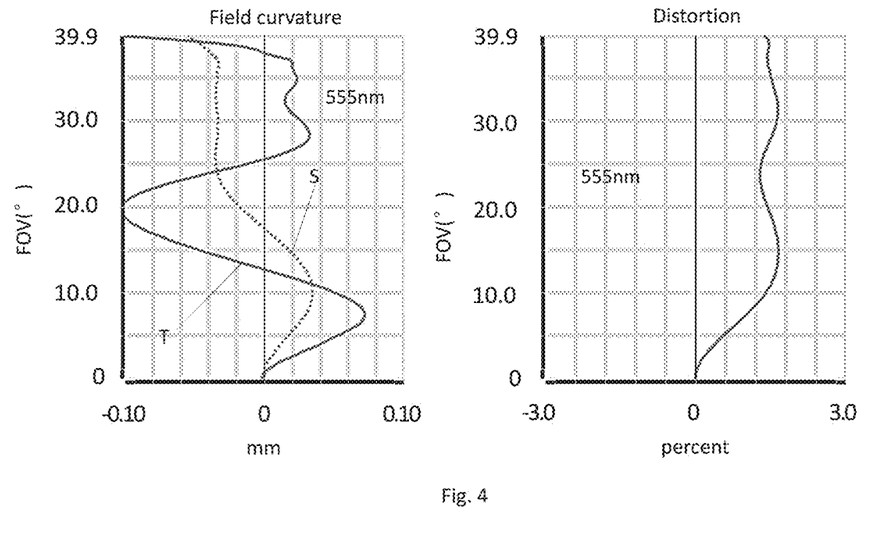
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 650 nm, 555 nm and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 shows various values of Embodiments 1, 2 and 3 and values corresponding to parameters which are specified in the above conditions.

As shown in Table 13, Embodiment 1 satisfies the above conditions.

In the present embodiment, the entrance pupil diameter (ENPD) of the camera optical lens 10 is 2.829 mm. The image height of 1.0H is 4.000 mm. The FOV is 79.77°. Thus, the camera optical lens 10 satisfies design requirements of large aperture, ultra-thin and wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

Figure 5:
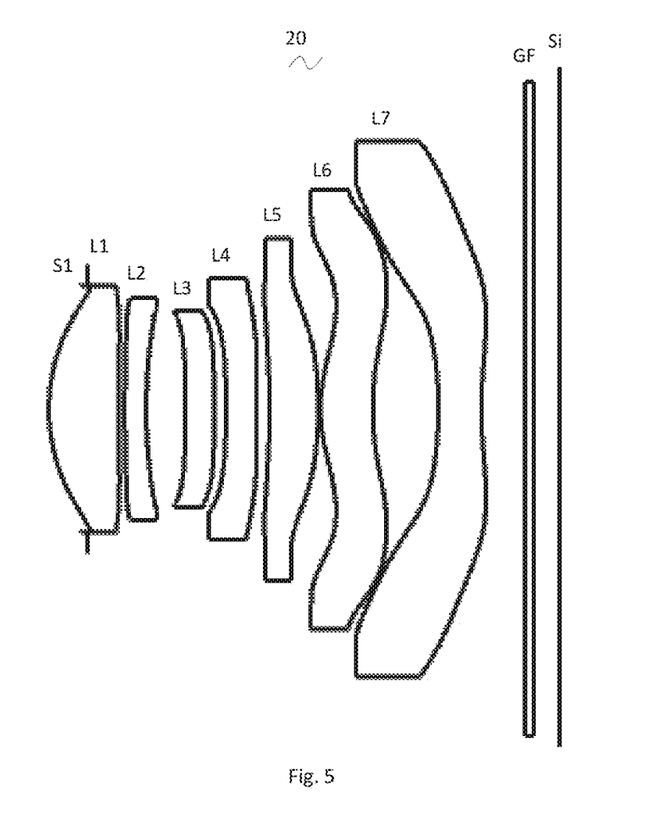
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

|  | R | d |  | nd |  | vd |
|---|---|---|---|---|---|---|
| S1 | ∞ | d0= | −0.451 |  |  |  |
| R1 | 2.129 | d1= | 0.815 | nd1 | 1.5444 v1 | 55.82 |
| R2 | 12.140 | d2= | 0.070 |  |  |  |
| R3 | 9.407 | d3= | 0.250 | nd2 | 1.6700 v2 | 19.39 |
| R4 | 5.327 | d4= | 0.455 |  |  |  |
| R5 | −43.956 | d5= | 0.338 | nd3 | 1.6153 v3 | 25.94 |
| R6 | −39.700 | d6= | 0.137 |  |  |  |
| R7 | −65.714 | d7= | 0.361 | nd4 | 1.6700 v4 | 19.39 |
| R8 | 20.997 | d8= | 0.153 |  |  |  |
| R9 | −5.607 | d9= | 0.559 | nd5 | 1.5444 v5 | 55.82 |
| R10 | −7.538 | d10= | 0.030 |  |  |  |
| R11 | 1.774 | d11= | 0.613 | nd6 | 1.5444 v6 | 55.82 |
| R12 | 4.670 | d12= | 0.763 |  |  |  |
| R13 | −5.049 | d13= | 0.500 | nd7 | 1.5346 v7 | 55.69 |
| R14 | 5.024 | d14= | 0.504 |  |  |  |
| R15 | ∞ | d15= | 0.110 | ndg | 1.5168 vg | 64.20 |
| R16 | ∞ | d16= | 0.295 |  |  |  |

Table 6 shows aspherical surface data of each lens of the camera optical lens 20 in Embodiment 2 of the present invention.

TABLE 6

|  | Conic coefficient | Aspheric surface coefficients | | | | |
|---|---|---|---|---|---|---|
|  | k | A4 | A6 | A8 | A10 | A12 |
| R1 | 0.0000E+00 | 2.8041E−02 | −1.4977E−01 | 4.1061E−01 | −6.8734E−01 | 7.2482E−01 |
| R2 | 0.0000E+00 | −7.3604E−02 | 6.5443E−02 | 6.7393E−03 | −1.0384E−01 | 1.3862E−01 |
| R3 | 0.0000E+00 | −9.5229E−02 | 9.8956E−02 | 1.0630E−02 | −1.5129E−01 | 1.9493E−01 |
| R4 | 0.0000E+00 | −2.4139E−02 | −1.1252E−01 | 6.5902E−01 | −1.6878E+00 | 2.5829E+00 |
| R5 | 0.0000E+00 | −4.9258E−02 | 5.4792E−02 | −2.2122E−01 | 4.0402E−01 | −5.0076E−01 |
| R6 | 0.0000E+00 | −9.6556E−02 | 2.6561E−01 | −6.3351E−01 | 7.9308E−01 | −4.7077E−01 |
| R7 | 0.0000E+00 | −2.2366E−01 | 7.5620E−01 | −2.2742E+00 | 4.5495E+00 | −6.0766E+00 |
| R8 | 0.0000E+00 | −1.4648E−01 | 4.0393E−01 | −8.6292E−01 | 1.0729E+00 | −8.2212E−01 |
| R9 | 0.0000E+00 | 4.1119E−02 | 1.8692E−01 | −5.0637E−01 | 5.6508E−01 | −3.5183E−01 |
| R10 | −4.3363E+00 | −1.0323E−01 | −9.7298E−03 | 1.3899E−01 | −1.7190E−01 | 1.1063E−01 |
| R11 | −1.6207E+00 | −8.7712E−02 | −4.1692E−02 | 4.1467E−02 | −8.8564E−03 | −4.7645E−03 |
| R12 | 0.0000E+00 | 1.5583E−01 | −2.6344E−01 | 1.8945E−01 | −8.5069E−02 | 2.5099E−02 |
| R13 | 0.0000E+00 | −7.2507E−03 | −2.1057E−02 | −2.7486E−02 | 3.3429E−02 | −1.3788E−02 |
| R14 | 0.0000E+00 | −3.1323E−02 | −2.0139E−02 | 9.2179E−03 | −1.5341E−03 | 1.0732E−04 |

|  | Conic coefficient | Aspheric surface coefficients | | | |
|---|---|---|---|---|---|
|  | k | A14 | A16 | A18 | A20 |
| R1 | 0.0000E+00 | −4.8605E−01 | 2.0082E−01 | −4.6701E−02 | 4.6739E−03 |
| R2 | 0.0000E+00 | −1.0089E−01 | 4.3622E−02 | −1.0449E−02 | 1.0723E−03 |
| R3 | 0.0000E+00 | −1.2832E−01 | 4.7043E−02 | −8.3977E−03 | 5.0794E−04 |
| R4 | 0.0000E+00 | −2.4955E+00 | 1.4976E+00 | −5.1149E−01 | 7.6725E−02 |
| R5 | 0.0000E+00 | 4.0793E−01 | −2.2157E−01 | 8.1671E−02 | −1.5773E−02 |
| R6 | 0.0000E+00 | −8.6823E−02 | 2.9983E−01 | −1.5970E−01 | 2.8135E−02 |
| R7 | 0.0000E+00 | 5.3544E+00 | −3.0064E+00 | 9.7844E−01 | −1.4085E−01 |
| R8 | 0.0000E+00 | 4.0186E−01 | −1.2296E−01 | 2.1512E−02 | −1.6412E−03 |
| R9 | 0.0000E+00 | 1.3292E−01 | −3.0491E−02 | 3.9185E−03 | −2.1641E−04 |
| R10 | −4.3363E+00 | −4.0734E−02 | 8.6166E−03 | −9.7793E−04 | 4.6322E−05 |
| R11 | −1.6207E+00 | 3.2252E−03 | −7.6263E−04 | 8.3391E−05 | −3.5435E−06 |
| R12 | 0.0000E+00 | −4.8353E−03 | 5.8119E−04 | −3.9288E−05 | 1.1353E−06 |
| R13 | 0.0000E+00 | 2.9469E−03 | −3.5165E−04 | 2.2296E−05 | −5.8686E−07 |
| R14 | 0.0000E+00 | −3.2859E−07 | −3.4080E−07 | 1.2671E−08 | 0.0000E+00 |

Table 7 and table 8 show design data of inflexion points and arrest points of respective lens in the camera optical lens 20 according to Embodiment 2 of the present invention.

TABLE 7

|  | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 1 | 1.245 | / | / | / | / |
| P1R2 | 1 | 0.365 | / | / | / | / |
| P2R1 | 2 | 0.385 | 0.645 | / | / | / |
| P2R2 | 0 | / | / | / | / | / |
| P3R1 | 0 | / | / | / | / | / |
| P3R2 | 0 | / | / | / | / | / |
| P4R1 | 0 | / | / | / | / | / |
| P4R2 | 2 | 0.185 | 1.315 | / | / | / |
| P5R1 | 5 | 0.485 | 0.665 | 1.035 | 1.535 | 1.755 |
| P5R2 | 3 | 1.195 | 1.805 | 1.995 | / | / |
| P6R1 | 3 | 0.645 | 1.775 | 2.285 | / | / |
| P6R2 | 2 | 0.795 | 2.265 | / | / | / |
| P7R1 | 1 | 1.475 | / | / | / | / |
| P7R2 | 3 | 0.625 | 2.105 | 2.195 | / | / |

TABLE 8

|  | Number of arrest points | Arrest point position 1 | Arrest point position 2 | Arrest point position 3 |
|---|---|---|---|---|
| P1R1 | 0 | / | / | / |
| P1R2 | 1 | 0.825 | / | / |
| P2R1 | 0 | / | / | / |
| P2R2 | 0 | / | / | / |
| P3R1 | 0 | / | / | / |
| P3R2 | 0 | / | / | / |
| P4R1 | 0 | / | / | / |
| P4R2 | 1 | 0.365 | / | / |
| P5R1 | 3 | 1.335 | 1.705 | 1.785 |
| P5R2 | 3 | 1.685 | 1.925 | 2.035 |
| P6R1 | 1 | 1.205 | / | / |
| P6R2 | 1 | 1.385 | / | / |
| P7R1 | 0 | / | / | / |
| P7R2 | 1 | 1.045 | / | / |

Figure 6:
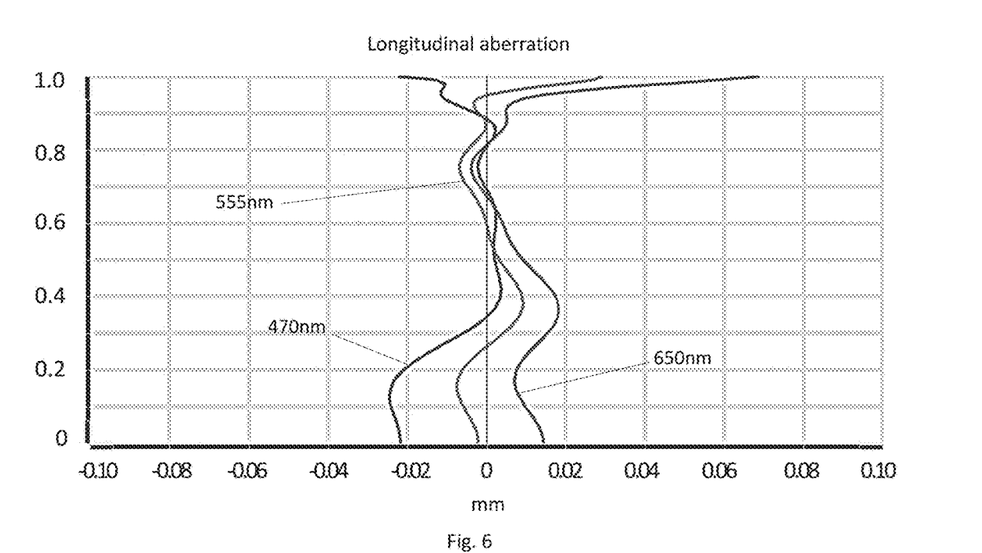
FIG. 6 is a schematic diagram of a longitudinal aberration of the camera optical lens shown in FIG. 5.
Figure 7:
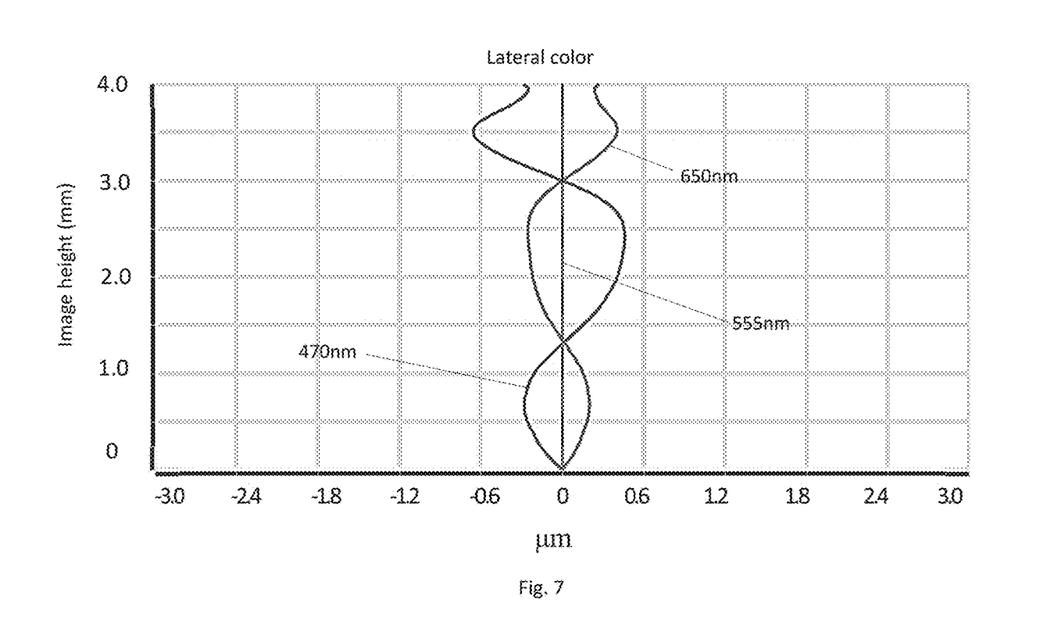
FIG. 7 is a schematic diagram of a lateral color of the camera optical lens shown in FIG. 5.
Figure 8:
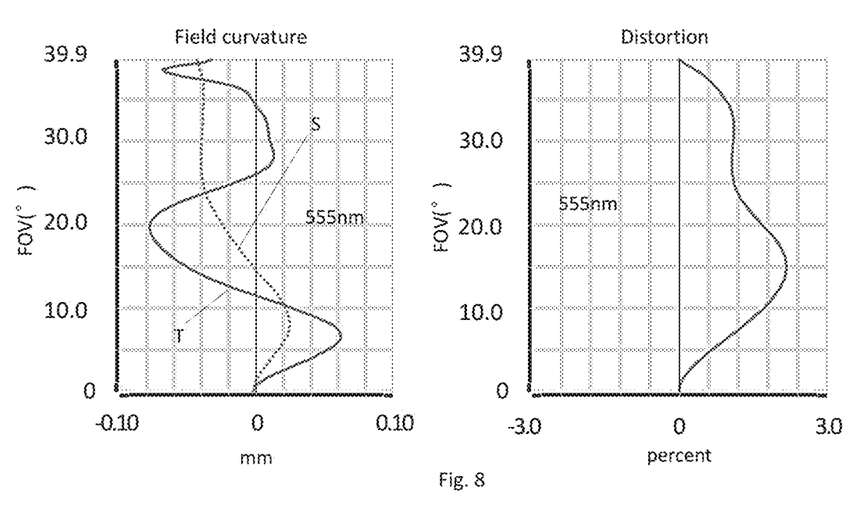
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 650 nm, 555 nm and 470 nm after passing the camera optical lens 20 according to Embodiment 2. FIG. 8 illustrates a field curvature and a distortion of light with a wavelength of 555 nm after passing the camera optical lens 10 according to Embodiment 2, in which a field curvature S is a field curvature in a sagittal direction and T is a field curvature in a tangential direction.

As shown in Table 13, Embodiment 2 satisfies the above conditions.

In the present embodiment, an entrance pupil diameter (ENPD) of the camera optical lens is 2.815 mm. An image height of 1.0H is 4.000 mm. An FOV is 79.76°. Thus, the camera optical lens 20 satisfies design requirements of large aperture, ultra-thin and wide-angle while the on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

Figure 9:
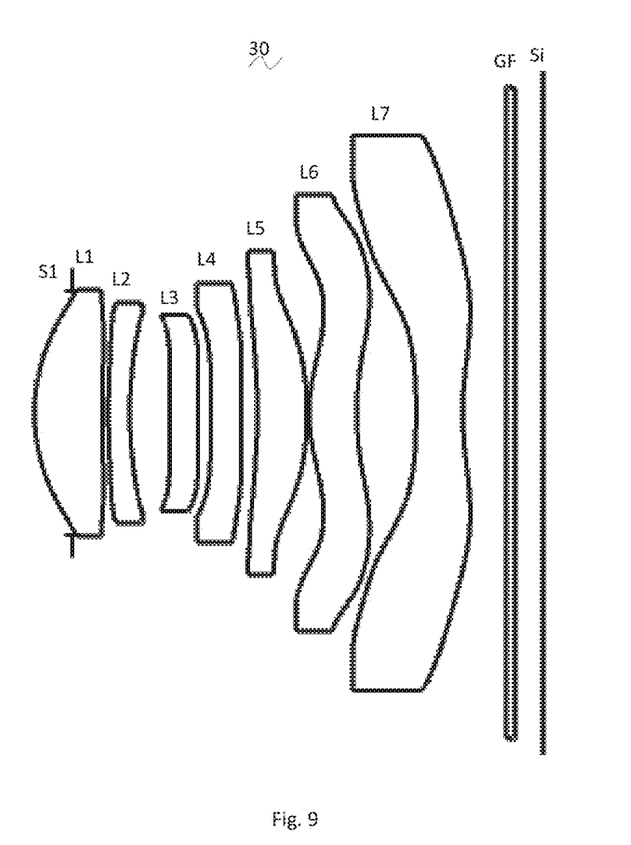
FIG. 9 is a schematic diagram of a structure of a camera optical lens in accordance with Embodiment 3 of the present invention.

An object side surface of a third lens L3 is convex at the paraxial position, and an image side surface of the third lens L3 is concave at the paraxial position. An object side surface of a fourth lens L4 is convex at the paraxial position. Tables 9 and 10 show design data of a camera optical lens 30 in Embodiment 3 of the present invention.

TABLE 9

|  | R |  | d | nd |  | vd |  |
|---|---|---|---|---|---|---|---|
| S1 | ∞ | d0= | −0.442 |  |  |  |  |
| R1 | 2.162 | d1= | 0.796 | nd1 | 1.5444 | v1 | 55.82 |
| R2 | 11.283 | d2= | 0.070 |  |  |  |  |
| R3 | 7.189 | d3= | 0.250 | nd2 | 1.6700 | v2 | 19.39 |
| R4 | 4.378 | d4= | 0.468 |  |  |  |  |
| R5 | 32.362 | d5= | 0.334 | nd3 | 1.6153 | v3 | 25.94 |
| R6 | 38.436 | d6= | 0.147 |  |  |  |  |
| R7 | 29.125 | d7= | 0.350 | nd4 | 1.6700 | v4 | 19.39 |
| R8 | 14.066 | d8= | 0.196 |  |  |  |  |
| R9 | −4.750 | d9= | 0.574 | nd5 | 1.5444 | v5 | 55.82 |
| R10 | −5.178 | d10= | 0.030 |  |  |  |  |
| R11 | 1.846 | d11= | 0.558 | nd6 | 1.5444 | v6 | 55.82 |
| R12 | 4.728 | d12= | 0.694 |  |  |  |  |
| R13 | −7.207 | d13= | 0.545 | nd7 | 1.5346 | v7 | 55.69 |
| R14 | 3.604 | d14= | 0.504 |  |  |  |  |
| R15 | ∞ | d15= | 0.110 | ndg | 1.5168 | vg | 64.20 |
| R16 | ∞ | d16= | 0.326 |  |  |  |  |

Table 10 shows aspherical surface data of each lens of the camera optical lens 30 in Embodiment 3 of the present invention.

TABLE 10

|  | Conic coefficient | Aspheric surface coefficients | | | | |
|---|---|---|---|---|---|---|
|  | k | A4 | A6 | A8 | A10 | A12 |
| R1 | 0.0000E+00 | 2.8563E−02 | −1.5032E−01 | 4.1071E−01 | −6.8717E−01 | 7.2485E−01 |
| R2 | 0.0000E+00 | −7.3564E−02 | 6.4845E−02 | 6.7513E−03 | −1.0367E−01 | 1.3869E−01 |
| R3 | 0.0000E+00 | −8.4876E−02 | 3.5607E−02 | 1.8768E−01 | −4.7184E−01 | 5.7283E−01 |
| R4 | 0.0000E+00 | −2.7053E−02 | −8.2514E−02 | 5.2903E−01 | −1.4059E+00 | 2.2444E+00 |
| R5 | 0.0000E+00 | −5.7436E−02 | 1.6309E−01 | −7.1606E−01 | 1.7682E+00 | −2.9036E+00 |
| R6 | 0.0000E+00 | −4.7511E−02 | −7.1539E−02 | 5.1882E−01 | −1.6485E+00 | 2.8256E+00 |
| R7 | 0.0000E+00 | −1.6312E−01 | 3.9972E−01 | −1.3179E+00 | 2.8420E+00 | −3.9304E+00 |
| R8 | 0.0000E+00 | −5.4307E−02 | 2.9417E−02 | −1.0763E−01 | 1.4092E−01 | −7.8209E−02 |
| R9 | 0.0000E+00 | 1.0964E−01 | −5.4951E−02 | −7.4400E−02 | 1.1281E−01 | −5.5493E−02 |
| R10 | −5.2036E+00 | −1.2200E−01 | 3.5557E−02 | 6.6666E−02 | −9.5425E−02 | 6.1079E−02 |
| R11 | −1.6275E+00 | −9.5035E−02 | −1.8062E−02 | 8.3711E−03 | 1.7242E−02 | −1.6704E−02 |
| R12 | 0.0000E+00 | 1.5304E−01 | −2.6281E−01 | 1.8680E−01 | −8.1945E−02 | 2.3415E−02 |
| R13 | 0.0000E+00 | −2.6719E−02 | −1.6891E−02 | −7.3603E−03 | 1.4709E−02 | −6.2601E−03 |
| R14 | 0.0000E+00 | −6.1770E−02 | −3.8156E−04 | 3.8422E−03 | −9.6845E−04 | 1.2178E−04 |

TABLE 10-continued

| | Conic coefficient | Aspheric surface coefficients | | | |
|---|---|---|---|---|---|
| | k | A14 | A16 | A18 | A20 |
| R1  | 0.0000E+00  | −4.8608E−01 | 2.0080E−01  | −4.6701E−02 | 4.6797E−03 |
| R2  | 0.0000E+00  | −1.0091E−01 | 4.3616E−02  | −1.0456E−02 | 1.0764E−03 |
| R3  | 0.0000E+00  | −4.1513E−01 | 1.8235E−01  | −4.4454E−02 | 4.6493E−03 |
| R4  | 0.0000E+00  | −2.2794E+00 | 1.4466E+00  | −5.2394E−01 | 8.3337E−02 |
| R5  | 0.0000E+00  | 3.0799E+00  | −2.0354E+00 | 7.6498E−01  | −1.2462E−01 |
| R6  | 0.0000E+00  | −2.9255E+00 | 1.8069E+00  | −6.0902E−01 | 8.5853E−02 |
| R7  | 0.0000E+00  | 3.4863E+00  | −1.9345E+00 | 6.1497E−01  | −8.5812E−02 |
| R8  | 0.0000E+00  | 1.6294E−02  | 2.1423E−03  | −1.5230E−03 | 1.8924E−04 |
| R9  | 0.0000E+00  | 8.9062E−03  | 1.8584E−03  | −8.9086E−04 | 9.5554E−05 |
| R10 | −5.2036E+00 | −2.1266E−02 | 4.0806E−03  | −4.0160E−04 | 1.5607E−05 |
| R11 | −1.6275E+00 | 6.4603E−03  | −1.2774E−03 | 1.2803E−04  | −5.1776E−06 |
| R12 | 0.0000E+00  | −4.3230E−03 | 4.9208E−04  | −3.1100E−05 | 8.2830E−07 |
| R13 | 0.0000E+00  | 1.2989E−03  | −1.4766E−04 | 8.8680E−06  | −2.2117E−07 |
| R14 | 0.0000E+00  | −8.9671E−06 | 3.7821E−07  | −7.2447E−09 | 0.0000E+00 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 1.255 | / | / |
| P1R2 | 1 | 0.385 | / | / |
| P2R1 | 0 | / | / | / |
| P2R2 | 0 | / | / | / |
| P3R1 | 1 | 0.255 | / | / |
| P3R2 | 1 | 0.215 | / | / |
| P4R1 | 1 | 0.145 | / | / |
| P4R2 | 1 | 0.345 | / | / |
| P5R1 | 3 | 1.065 | 1.465 | 1.695 |
| P5R2 | 3 | 1.185 | 1.785 | 1.855 |
| P6R1 | 3 | 0.635 | 1.805 | 2.295 |
| P6R2 | 3 | 0.775 | 2.295 | 2.555 |
| P7R1 | 2 | 1.465 | 2.715 | / |
| P7R2 | 1 | 0.645 | / | / |

TABLE 12

| | Number of arrest points | Arrest point position 1 |
|---|---|---|
| P1R1 | 0 | / |
| P1R2 | 1 | 0.875 |
| P2R1 | 0 | / |
| P2R2 | 0 | / |
| P3R1 | 1 | 0.435 |
| P3R2 | 1 | 0.355 |
| P4R1 | 1 | 0.255 |
| P4R2 | 1 | 0.575 |
| P5R1 | 0 | / |
| P5R2 | 0 | / |
| P6R1 | 1 | 1.185 |
| P6R2 | 1 | 1.345 |
| P7R1 | 0 | / |
| P7R2 | 1 | 1.175 |

Figure 10:
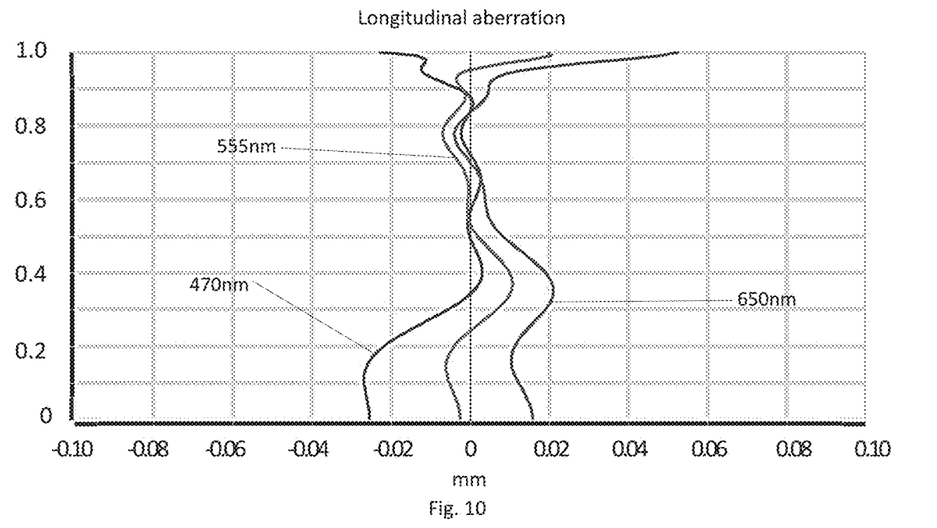
FIG. 10 is a schematic diagram of a longitudinal aberration of the camera optical lens shown in FIG. 9.
Figure 11:
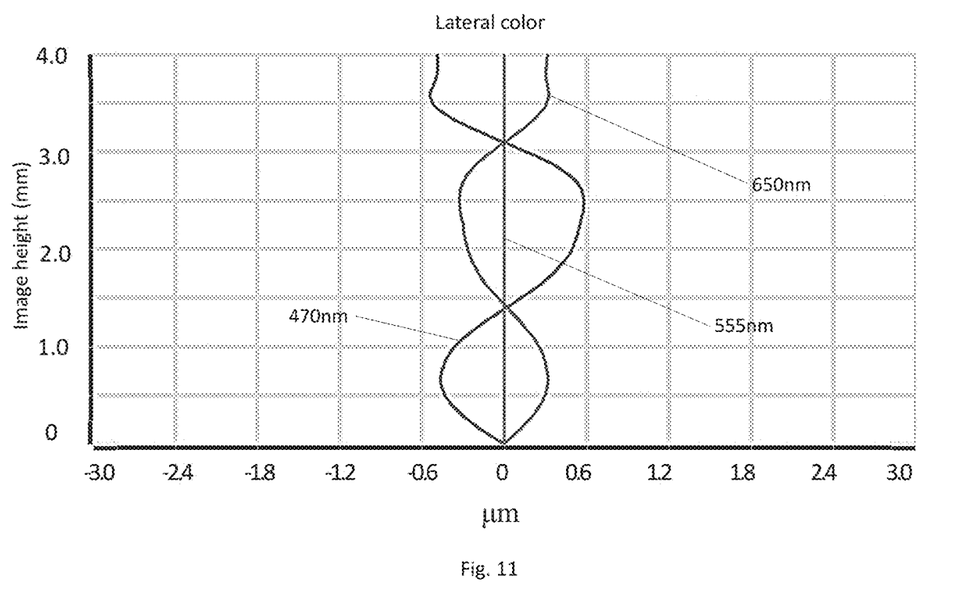
FIG. 11 is a schematic diagram of a lateral color of the camera optical lens shown in FIG. 9.
Figure 12:
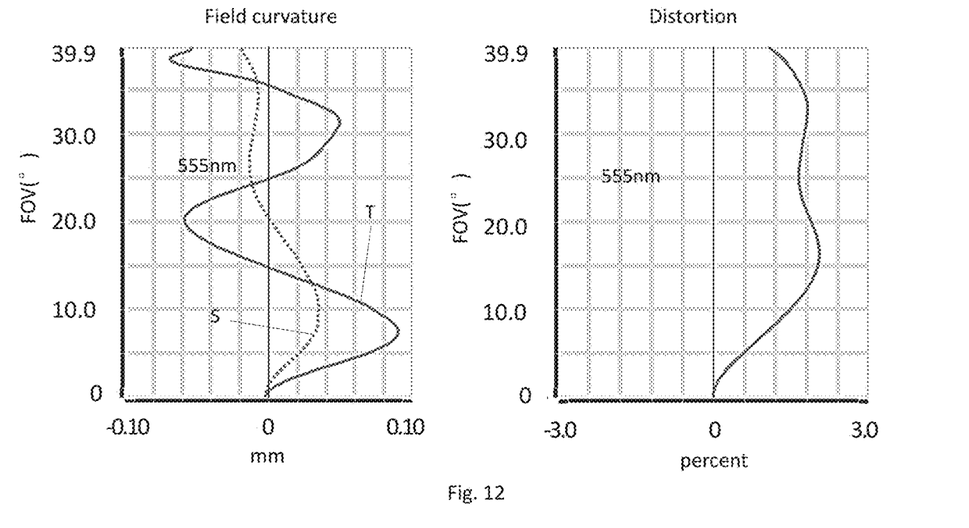
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 650 nm, 555 nm and 470 nm after passing the camera optical lens 30 according to Embodiment 3. FIG. 12 illustrates a field curvature and a distortion of light with a wavelength of 555 nm after passing the camera optical lens 30 according to Embodiment 3, in which a field curvature S is a field curvature in a sagittal direction and T is a field curvature in a tangential direction.

Table 13 in the following lists values corresponding to the respective conditions. In the present Embodiment 3 in order to satisfy the above conditions.

In the present embodiment, an entrance pupil diameter (ENPD) of the camera optical lens is 2.801 mm. An image height of 1.0H is 4.000 mm. An FOV is 79.75°. Thus, the camera optical lens 30 satisfies design requirements of large aperture, ultra-thin and wide-angle while the on-axis and off-axis aberrations are sufficiently corrected, thereby achieving excellent optical characteristics.

TABLE 13

| Parameters and conditions | Embodiment 1 | Embodiment 2 | Embodiment 3 |
|---|---|---|---|
| R7/R5  | 0.305    | 1.495    | 0.900 |
| R13/R14| −2.995   | −1.005   | −2.000 |
| f      | 4.719    | 4.785    | 4.734 |
| f1     | 4.543    | 4.595    | 4.750 |
| f2     | −17.977  | −18.623  | −17.168 |
| f3     | 200.000  | 642.350  | 323.698 |
| f4     | −38.892  | −23.494  | −40.610 |
| f5     | −200.000 | −44.620  | −200.000 |
| f6     | 5.192    | 4.874    | 5.191 |
| f7     | −3.914   | −4.615   | −4.402 |
| f12    | 5.600    | 5.677    | 6.039 |
| FNO    | 1.668    | 1.700    | 1.690 |
| TTL    | 5.852    | 5.952    | 5.952 |
| IH     | 4.000    | 4.000    | 4.000 |
| FOV    | 79.77°   | 79.76°   | 79.75° |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens with seven-piece lenses, comprising, from an object side to an image side in sequence: a first lens having a positive refractive power, a second lens having a negative refractive power, a third lens having a positive refractive power, a fourth lens having a negative refractive power, a fifth lens having a negative refractive power, a sixth lens having a positive refractive power and a seventh lens having a negative refractive power; wherein the camera optical lens satisfies the following conditions:

$$0.30 \leq R7/R5 \leq 1.50;$$
$$-3.00 \leq R13/R14 \leq -1.00;$$

$$-52.97 \leq f5/f \leq -1.50;$$
$$-29.00 \leq (R9+R10)/(R9-R10) \leq 1.78; \text{ and}$$
$$0.06 \leq d9/TTL \leq 0.12;$$

where,

R5: a central curvature radius of an object side surface of the third lens;

R7: a central curvature radius of an object side surface of the fourth lens;

R13: a central curvature radius of an object side surface of the seventh lens; and R14: a central curvature radius of an image side surface of the seventh lens;

f: a focal length of the optical camera lens;

f5: a focal length of the fifth lens;

R9: a central curvature radius of the object side surface of the fifth lens;

R10: a central curvature radius of the image side surface of the fifth lens;

d9: an on-axis thickness of the fifth lens; and

TTL: a total optical length from an object side surface of the first lens of the camera optical lens to an image surface of the camera optical lens along an optical axis.

2. The camera optical lens according to claim 1, wherein, the first lens has an object side surface being convex in a paraxial region and an image side surface being concave in the paraxial region; the camera optical lens further satisfies the following conditions:

$$0.48 \leq f1/f \leq 1.52;$$
$$-3.30 \leq (R1+R2)/(R1-R2) \leq -0.95; \text{ and}$$
$$0.07 \leq d1/TTL \leq 0.22;$$

where, f: a focal length of the optical camera lens;

f1: a focal length of the first lens;

R1: a central curvature radius of the object side surface of the first lens;

R2: a central curvature radius of the image side surface of the first lens;

d1: an on-axis thickness of the first lens; and

TTL: a total optical length from the object side surface of the first lens of the camera optical lens to an image surface of the camera optical lens along an optical axis.

3. The camera optical lens according to claim 2 further satisfying the following conditions:

$$0.77 \leq f1/f \leq 1.21;$$
$$-2.06 \leq (R1+R2)/(R1-R2) \leq -1.19; \text{ and}$$
$$0.11 \leq d1/TTL \leq 0.18.$$

4. The camera optical lens according to claim 1, wherein, the second lens has an object side surface being convex in a paraxial region and an image side surface being concave in the paraxial region; the camera optical lens further satisfies the following conditions:

$$-7.78 \leq f2/f \leq -1.89;$$
$$1.81 \leq (R3+R4)/(R3-R4) \leq 6.38; \text{ and}$$
$$0.02 \leq d3/TTL \leq 0.06;$$

where, f: a focal length of the optical camera lens;

f2: a focal length of the second lens;

R3: a central curvature radius of the object side surface of the second lens;

R4: a central curvature radius of the image side surface of the second lens;

d3: an on-axis thickness of the second lens; and

TTL: a total optical length from an object side surface of the first lens of the camera optical lens to an image surface of the camera optical lens along an optical axis.

5. The camera optical lens according to claim 4 further satisfying the following conditions:

$$-4.86 \leq f2/f \leq -2.37;$$
$$2.89 \leq (R3+R4)/(R3-R4) \leq 5.11; \text{ and}$$
$$0.03 \leq d3/TTL \leq 0.05.$$

6. The camera optical lens according to claim 1 further satisfies the following conditions:

$$3.65 \leq f3/f \leq 201.35;$$
$$-23.31 \leq (R5+R6)/(R5-R6) \leq 29.49; \text{ and}$$
$$0.03 \leq d5/TTL \leq 0.11;$$

where, f: a focal length of the optical camera lens;

f3: a focal length of the third lens;

R6: a central curvature radius of an image side surface of the third lens;

d5: an on-axis thickness of the third lens; and

TTL: a total optical length from an object side surface of the first lens of the camera optical lens to an image surface of the camera optical lens along an optical axis.

7. The camera optical lens according to claim 6 further satisfying the following conditions:

$$5.84 \le f3/f \le 161.08;$$
$$-14.57 \le (R5+R6)/(R5-R6) \le 23.59; \text{ and}$$
$$0.04 \le d5/TTL \le 0.09.$$

8. The camera optical lens according to claim 1, wherein, the fourth lens has an image side surface being concave in a paraxial region; the camera optical lens further satisfies the following conditions:

$$-17.16 \le f4/f \le -3.27;$$
$$-1.91 \le (R7+R8)/(R7-R8) \le 8.52; \text{ and}$$
$$0.03 \le d7/TTL \le 0.09;$$

where,
f: a focal length of the optical camera lens;
f4: a focal length of the fourth lens;
R8: a central curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

9. The camera optical lens according to claim 8 further satisfying the following conditions:

$$-10.72 \le f4/f \le -4.09;$$
$$-1.19 \le (R7+R8)/(R7-R8) \le 6.82; \text{ and}$$
$$0.04 \le d7/TTL \le 0.07.$$

10. The camera optical lens according to claim 1, wherein, the fifth lens has an object side surface being concave in a paraxial region and an image side surface being convex in the paraxial region.

11. The camera optical lens according to claim 1, wherein, the sixth lens has an object side surface being convex in a paraxial region and an image side surface being concave in the paraxial region; the camera optical lens further satisfies the following conditions:

$$0.29 \le f6/f \le 1.65;$$
$$-4.56 \le (R11+R12)/(R11-R12) \le -0.34; \text{ and}$$
$$0.05 \le d11/TTL \le 0.16;$$

where,
f: a focal length of the optical camera lens;
f6: a focal length of the sixth lens;
R11: a central curvature radius of the object side surface of the sixth lens;
R12: a central curvature radius of the image side surface of the sixth lens;
d11: an on-axis thickness of the sixth lens; and
TTL: a total optical length from an object side surface of the first lens of the camera optical lens to an image surface of the camera optical lens along an optical axis.

12. The camera optical lens according to claim 11 further satisfying the following conditions:

$$0.46 \le f6/f \le 1.32;$$
$$-2.85 \le (R11+R12)/(R11-R12) \le -0.42; \text{ and}$$
$$0.07 \le d11/TTL \le 0.12.$$

13. The camera optical lens according to claim 1, wherein, the object side surface of the seventh lens is concave in a paraxial region and the image side surface of the seventh lens is concave in the paraxial region; the camera optical lens further satisfies the following conditions:

$$-1.93 \le f7/f \le -0.40;$$
$$0.00 \le (R13+R14)/(R13-R14) \le 0.75; \text{ and}$$
$$0.04 \le d13/TTL \le 0.14;$$

where,
f: a focal length of the optical camera lens;
f7: a focal length of the seventh lens;
d13: an on-axis thickness of the seventh lens; and
TTL: a total optical length from an object side surface of the first lens of the camera optical lens to an image surface of the camera optical lens along an optical axis.

14. The camera optical lens according to claim 13 further satisfying the following conditions:

$$-1.21 \le f7/f \le -0.51;$$
$$0.00 \le (R13+R14)/(R13-R14) \le 0.60; \text{ and}$$
$$0.06 \le d13/TTL \le 0.11.$$

15. The camera optical lens according to claim 1, wherein an FNO of the camera optical lens is less than or equal to 1.75;
where,
FNO: an F number of the camera optical lens.

16. The camera optical lens according to claim 1, wherein an FOV of the camera optical lens is greater than or equal to 77.66°;
where,
FOV: a field of view of the camera optical lens in a diagonal direction.

17. The camera optical lens according to claim 1 further satisfying the following conditions: TTL/IH≤1.56;
where,
IH: an image height of the camera optical lens; and
TTL: a total optical length from an object side surface of the first lens of the camera optical lens to an image surface of the camera optical lens along an optical axis.

18. The camera optical lens according to claim 1 further satisfying the following conditions: 0.59≤f12/f≤2.07;
where,
f: a focal length of the optical camera lens; and
f12: a combined focal length of the first lens and the second lens.

19. The camera optical lens according to claim 18 further satisfying the following conditions: 0.95≤f12/f≤1.66.

* * * * *